United States Patent [19]

Charles

[11] Patent Number: 4,846,258
[45] Date of Patent: Jul. 11, 1989

[54] NON-RAM COOLING SYSTEM
[75] Inventor: Herbert N. Charles, Chatham, Canada
[73] Assignee: Bendix Electronics Limited, Chatham, Canada
[21] Appl. No.: 202,753
[22] Filed: Jun. 3, 1988
[51] Int. Cl.$^4$ ............................................. F01P 3/18
[52] U.S. Cl. ........................................ 165/41; 165/51; 123/41.49; 123/41.12; 180/68.1; 180/68.2; 60/599; 237/12.3 A
[58] Field of Search ................ 165/41, 51; 123/41.49, 123/41.65, 41.12; 180/68.2, 68.1; 60/599; 237/12.3 A

[56] References Cited

U.S. PATENT DOCUMENTS

| | | | |
|---|---|---|---|
| 1,655,518 | 1/1928 | Smith | 123/41.65 |
| 2,242,495 | 5/1941 | Wolf | 123/41.49 |
| 2,253,438 | 8/1941 | Lutz | 180/68.1 |
| 2,634,713 | 4/1953 | Bartch et al. | 123/41.49 |
| 2,766,836 | 10/1956 | Fessia | 180/68.2 |
| 3,669,203 | 6/1972 | Honda | 180/68.2 |
| 3,774,710 | 11/1973 | Gustavsson | 180/68.1 |
| 4,376,424 | 3/1983 | Mazur | 123/41.49 |
| 4,461,246 | 7/1984 | Clemente | 123/41.12 |
| 4,499,865 | 2/1985 | Charles | 123/41.49 |
| 4,697,665 | 10/1987 | Eastman et al. | 123/41.65 |

Primary Examiner—Albert W. Davis, Jr.
Assistant Examiner—John K. Ford
Attorney, Agent, or Firm—Russel C. Wells

[57] ABSTRACT

A cooling system for a vehicle having an engine mounted transversely to the longitudinal axis of the vehicle, a transmission mounted substantially parallel to the engine, comprising a power takeoff coupled to the engine, and a first shaft adapted to be driven by the engine and a transmission shaft, a blower, mounted about the transmission shaft, a drive unit connected to and driven by the first shaft and drivingly connected to the blower for rotating same; a first heat exchanger; a first duct for communicating air generated by the blower to the first heat exchanger.

14 Claims, 6 Drawing Sheets

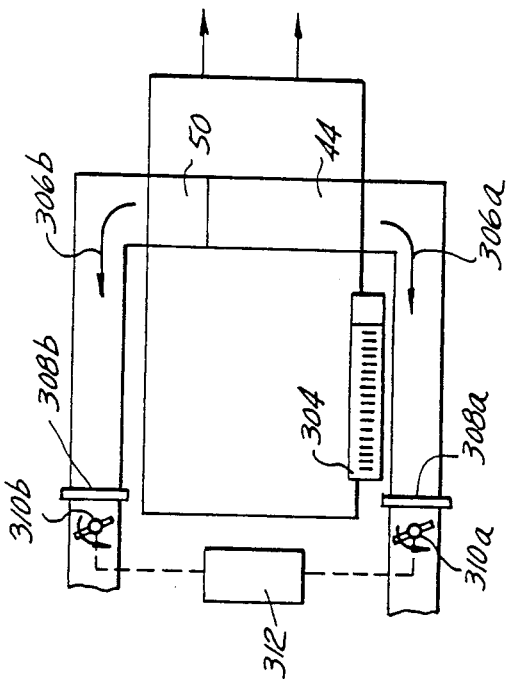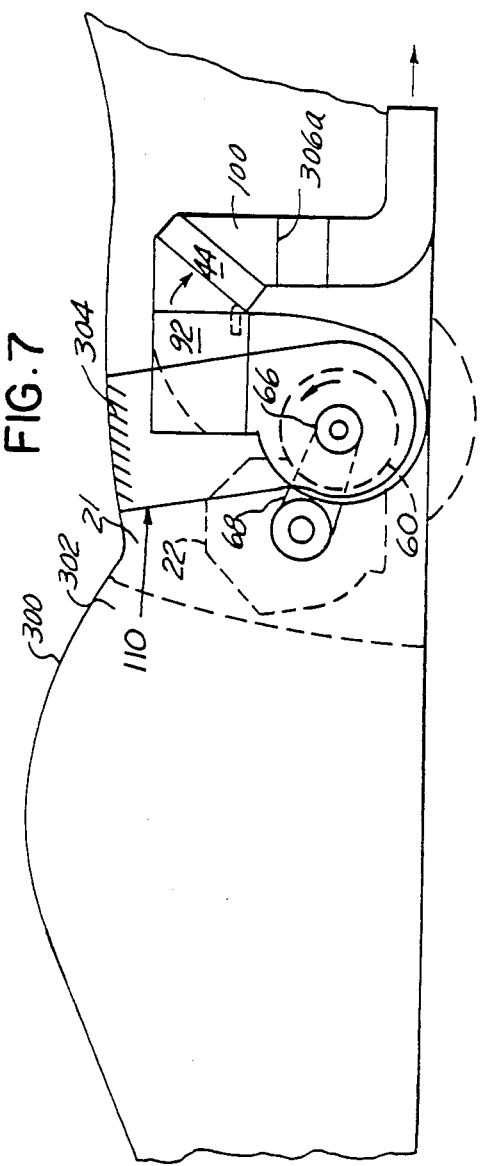

NON-RAM COOLING SYSTEM

BACKGROUND AND SUMMARY OF THE INVENTION

The present invention relates to vehicle cooling systems for non-ram vehicles and more particularly to a system for transversely mounted engines.

Most vehicles in production today utilize a forwardly mounted radiator or heat exchanger. Engine cooling is achieved by fans which are either directly driven by the engine or by an electric motor. Openings in the front of the vehicle permit air to be forced through the heat exchanger to supplement the cooling fan as the vehicle proceeds in a forward direction. The above class of engine cooling systems is often referred to as a ram-air system. In order to achieve a more aerodynamically efficient vehicle, it is desirable to streamline the front profile of the vehicle. Such streamlining may include removal of the frontal openings to lessen aerodynamic drag. As such, ram-air is no longer available for cooling. Ram-air is also not available for vehicles that use rear engine installations. Due to the compactness of the engine compartment it becomes increasingly difficult to provide a sufficient amount of non-ram air to cool the engine with normal fan configurations. This is especially true for vehicles using transversely mounted engine and/or transmission configurations. Further, because of the restrictions imposed by the size of the engine compartment and because of the finite electrical power available, it is not practical to simply employ a larger capacity horsepower fan to supply all of the cooling air.

It is an object of the present invention to provide a cooling system for non-ram engine installations. A further object of the present invention is to provide a cooling system for a transversely mounted engine installation. A further object of the present invention is to provide a cooling system whose output is proportional to temperature demand. Still another object of the invention is to utilize the engine cooling system in conjunction with a temperature control system to heat a passenger compartment.

Accordingly, the preferred embodiment of the invention comprises: a cooling system for an engine mounted transversely to the longitudinal axis of the vehicle; a transmission mounted substantially parallel to the engine, comprising a power takeoff coupled to the engine, including a first shaft adapted to be driven by the engine and a rotary continuously variable (CV) joint or coupling powered by a transmission shaft, extending parallel to the first shaft. The CV joint is drivingly connected to a driven vehicle wheel. The system may further include a blower rotationally supported about the CV joint; and drive means connected to and driven by the first shaft and drivingly connected to the blower for rotating same. A first heat exchanger is mounted downstream of the blower and adapted to receive engine coolant. An air duct is positioned in surrounding relation to the blower for defining, in cooperation with the blower, a blower intake for communicating air generated by the blower to the first heat exchanger. A second heat exchanger, such as an intercooler for a turbocharger, may be positioned within the first means and controllably connected therewith. The invention further includes an alternate embodiment which utilizes the waste hot air discharged from the heat exchanger(s) to heat a passenger compartment.

While the preferred embodiment utilizes a CV joint or coupling to support the blower, another embodiment of the invention contemplates supporting the blower, independent of the CV joint, on its own shaft or bearing. While mounting the blower remote from a power takeoff shaft affords the opportunity to use belts or gears to affect a speed increase, another embodiment of the invention contemplates mounting the blower about the power takeoff shaft. Further, it should be appreciated that the various heat exchangers can be mounted both upstream or downstream of blower. The different mounting location basically only changes the mode of air flow through the heat exchanger, i.e. blow-through versus draw-through.

Many other objects and purposes of the invention will be clear from the following detailed description of the drawings.

BRIEF DESCRIPTION OF THE DRAWINGS

In The Drawings:

FIG. 7 illustrates another embodiment of the invention.

FIGS. 8 and 9 illustrate still another embodiment of the invention.

DETAILED DESCRIPTION OF THE DRAWINGS

Figure 1:
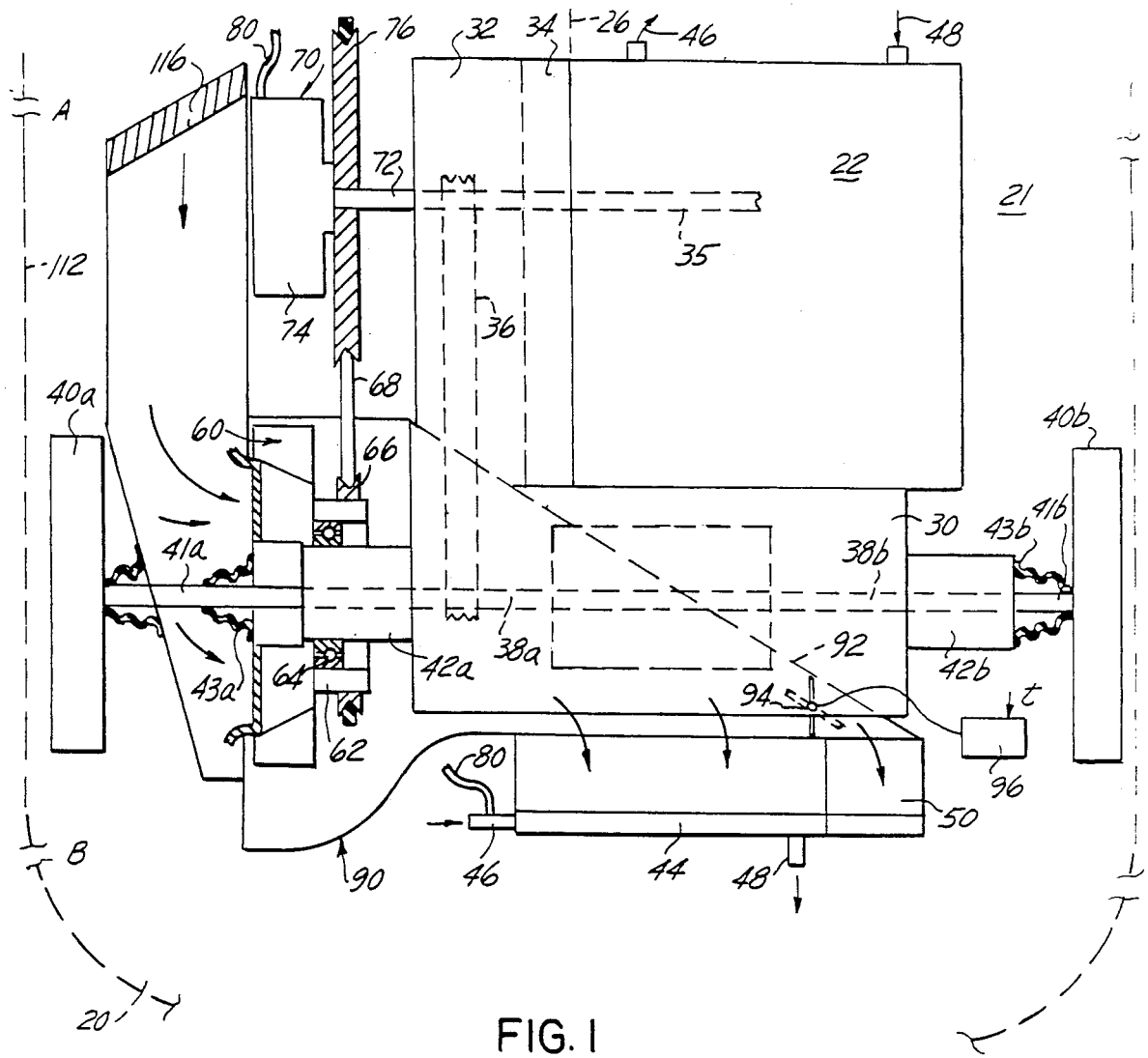
FIG. 1 diagrammatically illustrates the present invention.

Reference is made to FIG. 1 which illustrates a vehicle 20 (shown in phantom line), having an engine compartment 21. Situated within the engine compartment 21 is an engine 22 mounted transversely to a longitudinal axis 26 of the vehicle. The front and rear of the vehicle 20 are not expressly identified nor is the relationship of the engine compartment 21 to the passenger compartment. FIG. 1 illustrates locations A and B to show, in a general sense, that the present invention can be used in front and rear wheel drive vehicles, and both fore and aft of any passenger compartment. Mounted adjacent the engine is a transmission 30. The transmission is drivingly connected to the engine by a power take-off unit 32. The power take-off unit may include a torque converter 34. The power take-off unit 32 and engine crankshaft 35 are shown schematically as driving the transmission 30 through a chain drive 36 typical of that used in transverse mounting configurations. While shown as separate elements, a transmission 30 would normally include the torque converter 34 and power take-off unit 32. The transmission 30 includes an output shaft(s) 38a and/or b which are connected to the drive wheels 40a and b respectively through the shafts 41a,b and continuously variable (CV) joints 42a and b. Boots 43a,b may be disposed about the shafts to protect the CV joints. These CV joints 42 are typically splined or otherwise connected to their corresponding output shafts 38. Situated adjacent the engine 22 and transmission 30 is a heat exchanger such as radiator 44. The heat exchanger may be mounted fore or aft of the engine/transmission such that cooling air is either blown or drawn therethrough. The radiator 44 includes a coolant input 46 (at its top) to receive engine coolant and a coolant output 48 (at its bottom) to return the coolant to the engine. A second heat exchanger 50 is optionally mounted adjacent to the first heat exchanger 44. The heat exchanger 50 may be utilized to cool transmission oil. Alternatively, if the engine is equipped with a turbocharger, the second heat exchanger may be an intercooler which cools the boosted turbocharger air. As can be seen by the above described engine/transmission/heat exchanger installation, ram-air is not available to cool the heat exchangers and as such sufficient non-ram cooling air must be supplied by some means having a capacity sufficient to adequately cool the heat exchanger(s). It can be appreciated that in the above configuration all of the air used for cooling must be generated by a fan (since ram-air is not available for cooling). The power requirements of this fan are sufficiently high to exclude the use of the more conventional electrically driven fan.

Figure 1A:
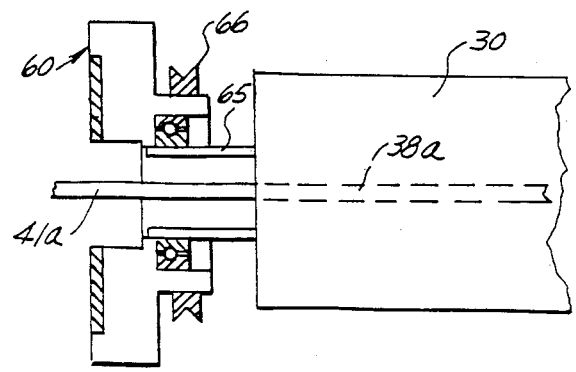
FIG. 1A illustrates an alternate embodiment of the invention.

It is contemplated that the heat exchangers 44 and/or 50 will be cooled by a system utilizing a centrifugal fan or blower 60. It should be appreciated that the space available in the above describe engine/transmission installation is severely limited by the small size of the engine compartment 21 which in part is defined by the aerodynamically streamlined vehicle body panels and hood. In FIGURE 1, the blower 60 is rotatingly mounted coaxial to the transmission output shafts 38a and b. More particularly, the blower 60 is mounted to the outer housing 61 of one of the CV joints such as 42a, thus providing for an extremely compact configuration. A circumferential blower flange 62 is supported by a bearing 64 about the CV joint 42a. While the above preferred embodiment secures the bearing 64 to the outer diameter of the CV joint body, a separate flange or support 65 (see FIG. 1A) extending from the transmission housing can be suitably utilized. Attached to or formed as an integral component of the blower flange 62 is a first pulley 66 adapted to receive a V-belt 68, or other drive link, which is driven by a drive unit generally shown as 70. The drive unit 70 is driven by the engine through the take-off unit 32. As an example, the drive unit 70 may be coupled with and driven by an extension of the torque converter shaft 72.

While only diagramatically illustrated in FIG. 1, the drive unit 70 may include a viscous clutch 74 which includes an output pulley 76 preferably having a diameter larger than that of the first pulley 66. It is contemplated that the drive unit 70 may include means by which its output is controlled in proportion to cooling demand. This may be accomplished by using what is known as a remote sensing viscous clutch. One such installation includes utilizing a temperature responsive viscous clutch of known variety which utilizes a capillary tube 80 connected to sense coolant temperature. As illustrated in FIG. 1, one end of the capillary tube 80 is connected to the inlet 46 of the radiator 44, while its other end is communicated to the viscous clutch 74 in a known manner. In this manner the drive characteristics of the viscous clutch 74 will vary in accordance with engine coolant temperature thereby driving the blower 60 via the belt 68. The output of the clutch may be controlled in a continuous, temperature dependent fashion, or activated at a predetermined temperature. By utilizing the remote sensing viscous clutch engine power is transmitted to the blower only when there is a need to cool the heat exchanger(s) thereby lessening the parasitic drag on the engine. It should be appreciated that the viscuous clutch can be replaced by a variety of electrically operated clutches with corresponding electrical temperature sensors and controllers.

Positioned about the blower 60 is a blower casing 90 which is more clearly illustrated in the other FIGURES. The blower casing may be formed separate or part of an intake box to direct air to the blower 60. The intake box 110 may be located proximate the inner fender panel 112 about the wheel well. The intake box 110 includes an inlet air opening 116. Secured to the blower casing 90 is a duct 92 communicated to the heat exchangers 44 and 50. The duct 92 is shown in dotted line so as not to obscure other elements of FIG. 1. As mentioned above, the second heat exchanger 50 is preferably mounted substantially parallel to and adjacent the radiator 44. It should be appreciated that if the heat exchanger 50 is in constant communication with the blower 60 it might lessen the airflow through the radiator. Since the periods of cooling demand for the second heat exchanger 50 may be different from the required by the radiator 44, it is contemplated that the present invention may include a damper, such as damper 94, rotatably mounted within the duct 92 and positioned upstream of the heat exchanger 50. The damper 94 may be rotated by a control or actuator unit 96 in response to a signal indicative of the temperature of the fluid to be cooled. Such temperature signal may be generated by an electronic control unit in a known variety. If the heat exchanger 50 is used to cool boost air from a turbocharger or supercharger the damper can be controlled by the turbocharger or supercharger electronics. During intervals when it is not necessary to cool the fluid within the heat exchanger 50, the control unit 96 will maintain the damper 94 in the position indicated in FIG. 1 thereby permitting all of the cooling air to be forced through the radiator 44. During those instances when the fluid or air communicated to the heat exchanger 50 necessitates cooling the control unit 96 may partially or fully open the damper 94 (shown as dotted line) thereby permitting cooling air to flow through the heat exchanger 50.

Figure 2:
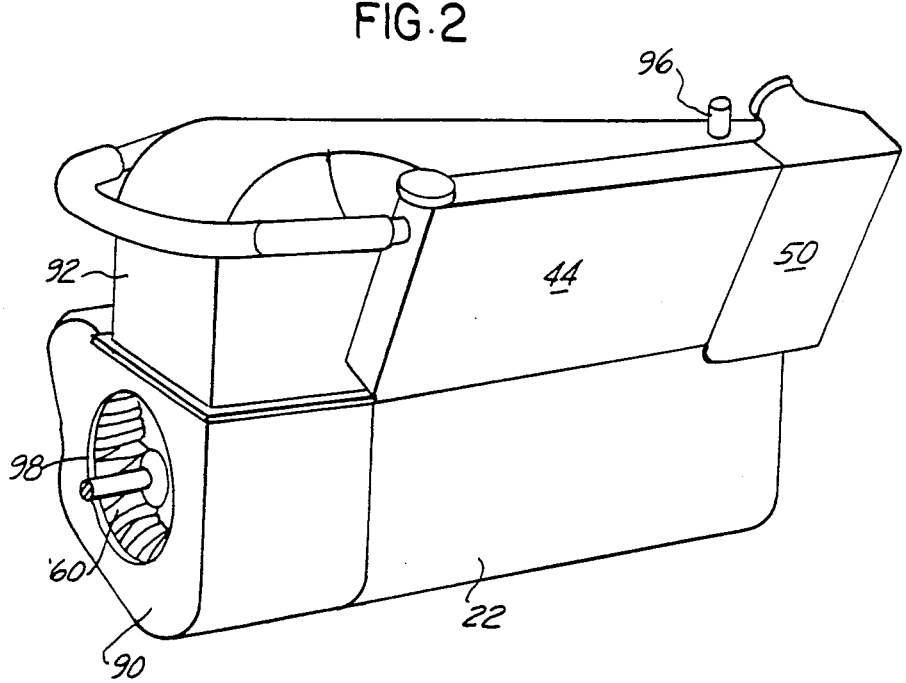
FIG. 2 and 3 are rear and side orthogonal views of a cooling system.
Figure 3:
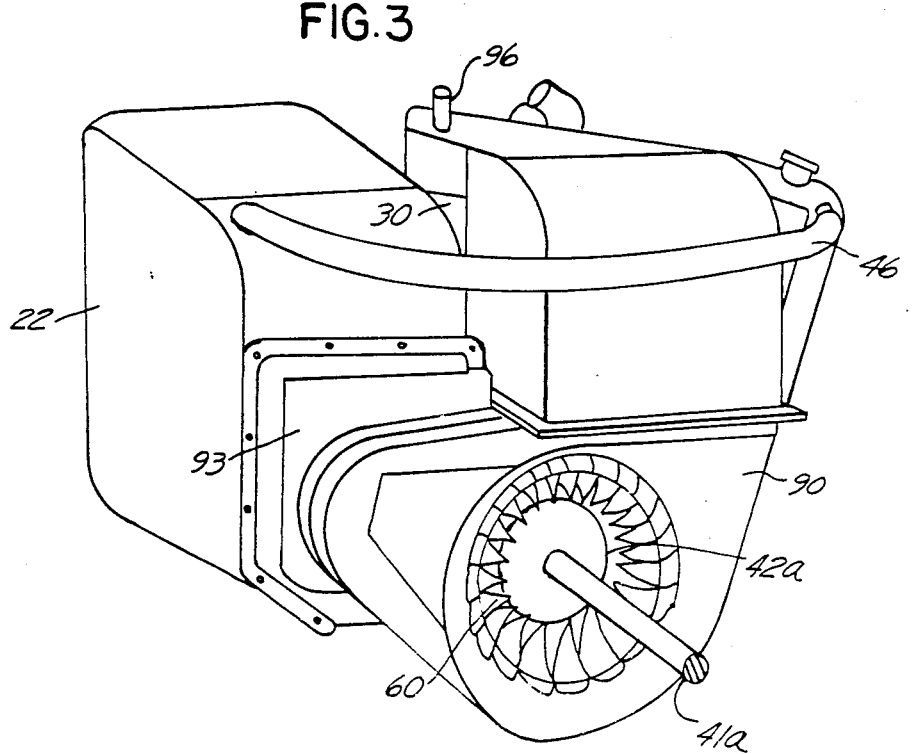
Figure 4:
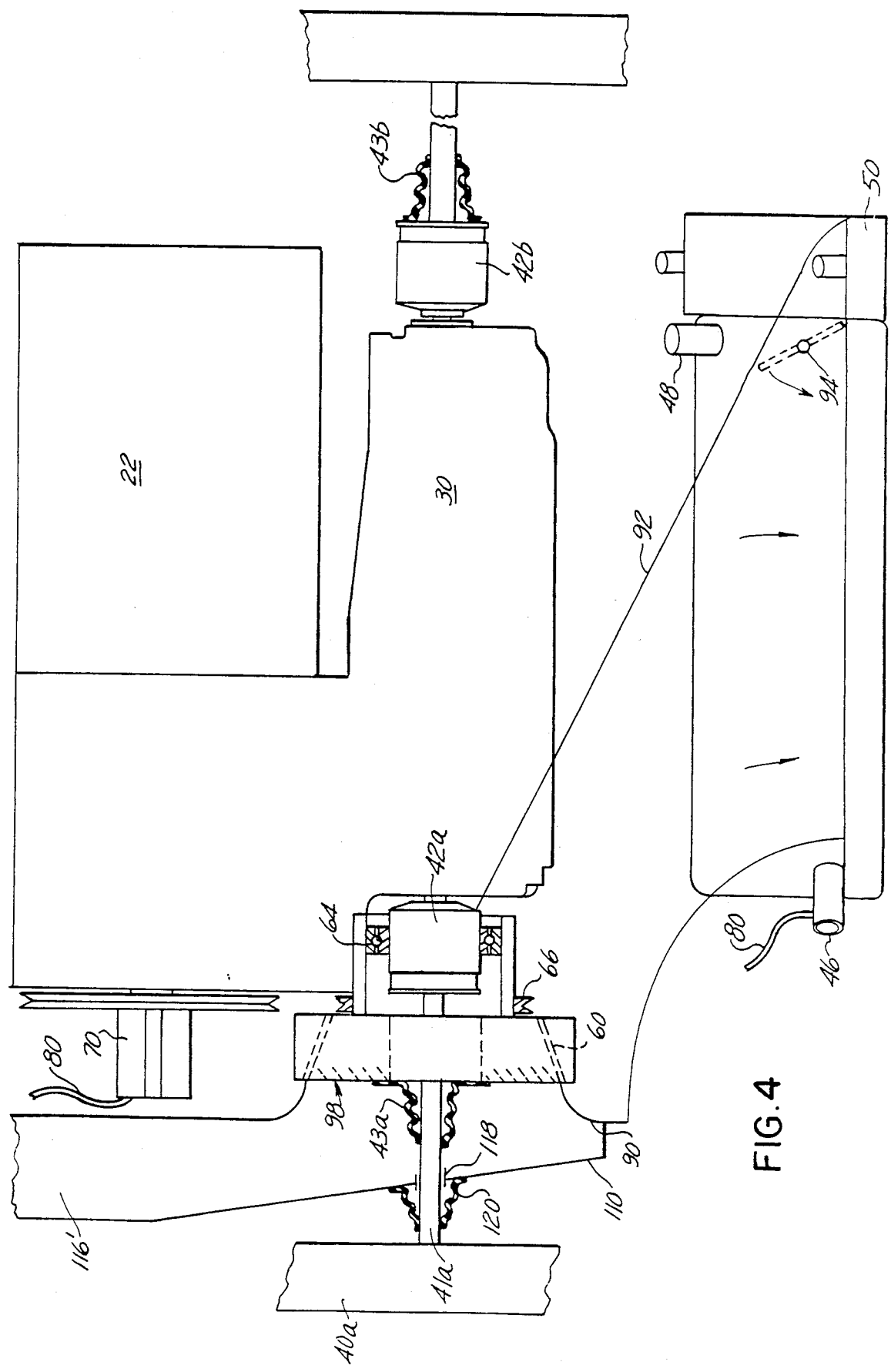
FIG. 4 is a top view of the cooling system of FIGS. 2 and 3.

Reference is made to FIGS. 2-4 which illustrate in greater detail the major components of the present invention. FIGS. 2 and 3 are rear and side orthogonal views of the present invention. FIG. 4 illustrates a top view of the embodiment of the invention illustrated in FIGS. 2 and 3. The heat exchangers 44 and 50 are mounted in a slanted orientation to more easily fit within the engine compartment. FIGS. 2 and 3 more clearly illustrate the mounting relationship of the blower 60 to the outer diameter casing of the CV joint 42a. The intake box has been removed from FIGS. 2 and 3 for convenience. The blower casing 90 and duct 92 are similarly illustrated with greater clarity in the above FIGURES. While the viscous clutch 94 cannot be seen in FIG. 3, it is located in the upper lefthand portion 93 of the blower casing 90 which is appropriately mounted by bolts or the like to the engine 22. The relation of the output pulley 76 of the viscous clutch and the blower pulley 66 are more clearly shown in FIGS. 4 and 5.

Figure 5:
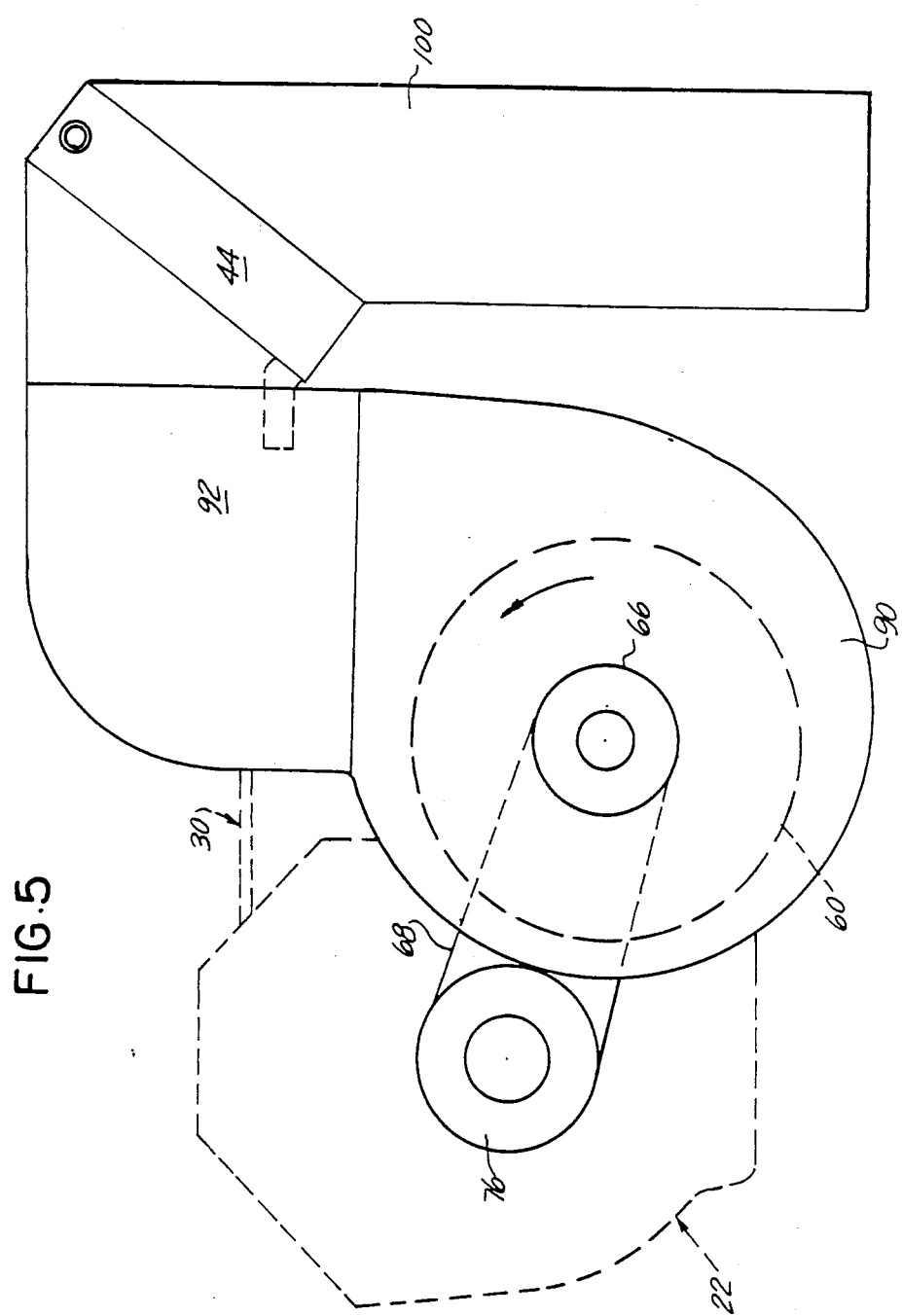
FIG. 5 illustrates the pulley arrangement used in the above system.
Figure 6:
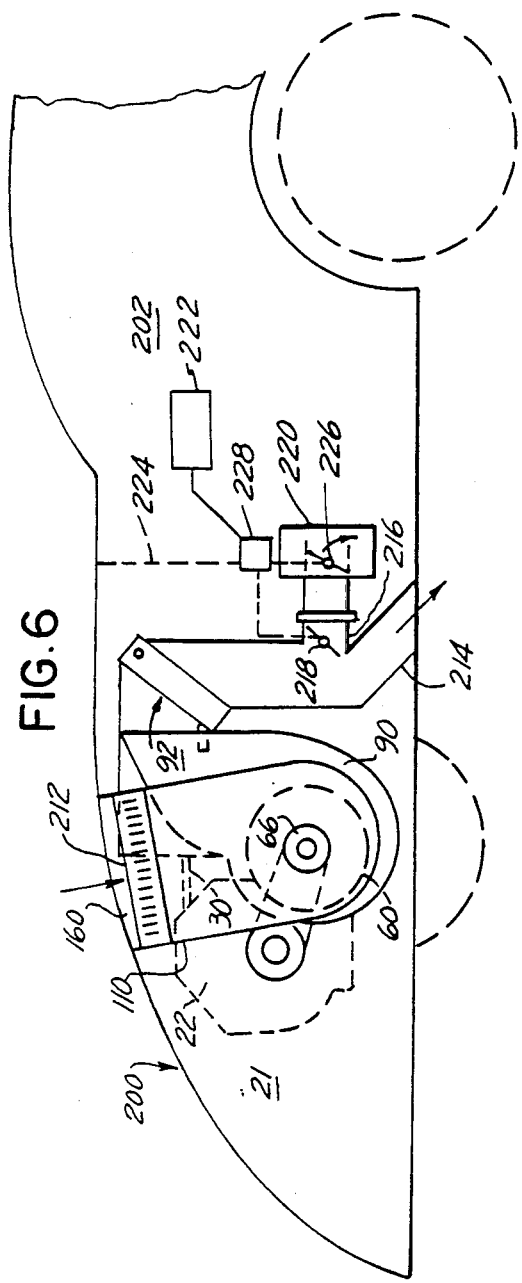
FIG. 6 shows an alternate embodiment of the invention.

FIG. 4 also illustrates an inlet box 110 extending from the blower opening 98 of the blower casing 90. The intake box is an enclosed structure having a remotely located air inlet 116. The inlet box is also provided with another opening 188, about the axle 41a and boot 120 which seal the opening 118 to prevent contamination. The remote inlet may be connected to any point in the vehicle outer shell to permit clean air to enter the blower. FIG. 5 more particularly illustrates the drive means 70 and its interconnection with the blower pulley. FIGURE 5 further illustrates that the air discharged from the radiator and/or second heat exchanger may be ducted away from the engine compartment through a duct 100 extending therefrom. FIG. 6 illustrates a front wheel drive vehicle 200 with the engine mounted in front of a passenger compartment 202. An inlet box 110 has been superimposed over the engine/transmission configuration (identical to that shown in FIGURE 5). The opening 160 of the inlet box is located in a side fender panel sufficiently above ground level such that the ambient clear air is drawn into the inlet box. A filter such as filter 212 may be positioned downstream of the opening 160. As illustrated, the outlet end 214 of duct 100 extends below the engine 22 to vent hot air away from the engine compartment 21. Instead of or in conjunction with duct 100, the heated air exiting the heat exchangers may be ducted into the passenger compartment 202 through a duct 216. The duct 216, extends through the fire wall 224 and may include a damper 218 and filter 220, and is communicated to a temperature control unit 222 which may include another damper mechanism 226. The temperature control unit 222, of known variety, in response to passenger demand will regulate the amount of heated air entering the passenger compartment by controlling the dampers 226 and/or 218 by an actuator 228 to thereby heat same. It should be appreciated that one damper is needed. One particular advantage of the above alternate embodiment of the invention is that effective heating of the passenger compartment can be accomplished without the necessity of a conventional type coolant heater core.

Figure 9:
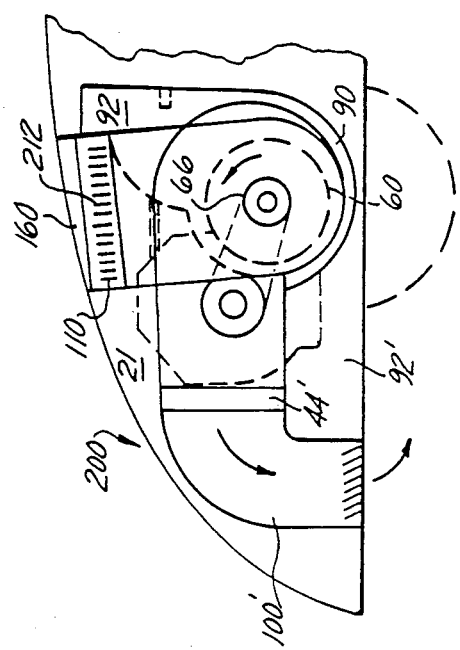

FIGS. 7 and 8 illustrate the use of the present invention in an exemplary rear wheel drive vehicle 300. As can be seen, the engine/transmission installation is installed within the engine compartment 21 rearward of the passenger compartment 302. As with FIG. 7, the inlet box 110 has been superimposed about the blower 60. The inlet box 110 includes an inlet 304 which extends to the rear panel, rear deck lid, or other equivalent location. The exhaust duct 100 extends downwardly to vent hot air away from the engine compartment. Extending from the duct 100 is at least one additional air duct 306a and/or b. This duct and/or ducts, extends forward of the exhaust duct 100 toward the passenger compartment 302. More specifically these ducts 306 may be positioned along the vehicle skin and may include air filters 308. The damper mechanisms are controlled in a conventional manner by a heater control unit 312 to regulate the temperature of the passenger compartment 302. It should be appreciated that while the above figures illustrate heat exchangers positioned rearward of the engine and transmission this is not a limitation of the present invention. In each of the above embodiments the various heat exchangers can be mounted in front of the engine/transmission with appropriate changes in the duct arrangement in either a blow-through or draw-through configuration. As an example, FIG. 9 illustrates a cooling system superimposed upon the engine/transmission configuration illustrated in many of the earlier figures. In FIG. 9, the heat exchanger 44' and ducting 92' are located forward of the engine/transmission configuration. An output duct 100', positioned forward of the heat exchanger or radiator 44', channels the hot air exiting the radiator 44' out of the engine compartment 21.

Many changes and modifications in the above described embodiment of the invention can, of course, be carried out without departing from the scope thereof. Accordingly, that scope is intended to be limited only by the scope of the appended claims.

I claim:

1. A cooling system for a vehicle comprising: an engine mounted transversely to the longitudinal axis of the vehicle;
   a transmission mounted substantially parallel to the engine, comprising a power takeoff unit coupled to the engine, a first output shaft adapted to be driven by the engine and a transmission output shaft for driving the vehicle wheels;
   a blower
   means for supporting the blower about the transmission output shaft;
   drive means connected to and driven by the first output shaft and drivingly connected to the blower for rotating same;
   a first heat exchanger for cooling engine coolant;
   first duct means for communicating air generated by the blower to the first heat exchanger.

2. The system as defined in claim 1 wherein said drive means comprises means for driving the blower at speeds as a function of engine temperature.

3. The system as defined in claim 2 wherein the drive means comprises a temperature responsive viscous clutch the output of which varies according to engine coolant temperature.

4. The system as defined in claim 3 wherein the drive means comprising means for controlling the output of the viscous clutch in proportion to the temperature of engine coolant.

5. The system as defined in claim 1 wherein the engine includes a second heat exchanger mounted within the first duct means to receive cooling air, the first duct means comprising:
   means, responsive to a signal for controlling the communication of cooling air to the second heat exchanger.

6. The system as defined in claim 5 wherein the communicating means includes a damper mounted in the first duct means and movable to permit cooling air to flow to the second heat exchanger.

7. The system as defined in claim 6 wherein the damper is moved by an actuator through open and closed positions in response to a signal indicative of fluid temperature in the second heat exchanger.

8. The system as defined in claim 1 wherein a continuously variable coupling is drivingly connected to the transmission shaft and wherein the blower is mounted about the transmission shaft and rotatingly supported by the continuously variable coupling.

9. The system as defined in claim 1 wherein the blower intake is located in a vehicle body portion to insure the inflow of substantially clean air.

10. The system as defined in claim 1 further including second duct means for ducting hot air from the first heat exchanger and away from the engine.

11. The system as defined in claim 10 wherein the second duct means includes third duct means for ducting at least a portion of the hot air into a passenger compartment, and means for controlling the temperature level of the compartment in response to passenger demand.

12. The system as defined in claim 11 wherein the third duct means includes an inlet damper movable in response to a control signal for bypassing hot air from the second duct means to the passenger compartment.

13. The system as defined in claim 12 wherein the third duct means includes an exit damper proximate the passenger compartment movable in response to a control signal indicative of passenger temperature demand.

14. The system as defined in claim 11 wherein the engine is located in an engine compartment behind the passenger compartment, the first heat exchanger is located behind the engine, the second duct means is operative to exhaust heated air out from the rear of the engine compartment, and wherein the third duct means includes at least one air duct extending forward of the second duct means into the passenger compartment.

* * * * *